United States Patent [19]

Fried

[11] Patent Number: 4,820,124
[45] Date of Patent: Apr. 11, 1989

[54] METHOD OF MANUFACTURING ROTATING THERMAL MACHINE BLADING CONSISTING OF AN AIRFOIL, A ROOT AND A SHROUD PLATE OR A SHROUD BY FASTENING A SHROUD PLATE, AND A BLADE MANUFACTURED BY THIS METHOD

[75] Inventor: Reinhard Fried, Nussbaumen, Switzerland

[73] Assignee: BBC Brown Boveri AG, Baden, Switzerland

[21] Appl. No.: 181,104

[22] Filed: Apr. 13, 1988

[30] Foreign Application Priority Data

Apr. 13, 1987 [CH] Switzerland .......................... 1419/87

[51] Int. Cl.$^4$ .............................................. F01D 5/22
[52] U.S. Cl. .................................. 416/191; 416/195; 416/221
[58] Field of Search ................ 416/191, 192, 221, 195

[56] References Cited

U.S. PATENT DOCUMENTS

| | | | |
|---|---|---|---|
| 1,423,466 | 7/1922 | Snyder | 416/191 |
| 1,720,754 | 7/1929 | Baumann | 416/192 |
| 2,445,154 | 7/1948 | Reed | 416/221 |
| 3,501,247 | 3/1970 | Tournere | 416/195 X |
| 4,211,516 | 7/1980 | Speil | 416/191 |

FOREIGN PATENT DOCUMENTS

| | | | |
|---|---|---|---|
| 145116 | 10/1903 | Fed. Rep. of Germany | 416/221 |
| 838670 | 5/1952 | Fed. Rep. of Germany | 416/221 |
| 1374916 | 8/1964 | France | 416/195 |
| 173803 | 1/1922 | United Kingdom | 416/221 |
| 267405 | 3/1927 | United Kingdom | 416/195 |
| 281032 | 12/1927 | United Kingdom | 416/195 |

*Primary Examiner*—Everette A. Powell, Jr.
*Attorney, Agent, or Firm*—Oblon, Fisher, Spivak, McClelland & Maier

[57] ABSTRACT

Blading for a rotating thermal machine consists of an airfoil (1), a root (4) and a shroud plate (5) or a shroud, the tip (2) of the airfoil (1) having a spigot-type step (11) with a semi-circular groove (12) extending around the whole periphery of its generated surface. The shroud plate (5) or the shroud has a recess corresponding to the step (11) with a semi-circular groove (8) extending around the complete periphery. At least one piece of a firmly seated heat-resisting wire (10) is located in the circular duct formed by the grooves (8, 12) as the fastening element between the components (1, 5). The blading is manufactured by pushing and/or pulling the wire (10) sideways into the duct formed by the grooves (8, 12). Optimum material combination, particularly for highly loaded gas turbine blading, is possible by selecting an oxide-dispersion-hardened superalloy with longitudinally directed columnar crystals for the airfoil (1) and a non-oxide-dispersion-hardened cast or forged superalloy for the shroud plate (5) or the shroud.

15 Claims, 8 Drawing Sheets

A-A

METHOD OF MANUFACTURING ROTATING THERMAL MACHINE BLADING CONSISTING OF AN AIRFOIL, A ROOT AND A SHROUD PLATE OR A SHROUD BY FASTENING A SHROUD PLATE, AND A BLADE MANUFACTURED BY THIS METHOD

BACKGROUND OF THE INVENTION

1. Field of the Invention

Rotating thermal machines for very high duties. The critical component is the blading which has to ensure the greatest possible life under strongly fluctuating mechanical and thermal conditions.

The invention concerns the further development of highly loaded blading for rotating thermal machines, in particular for gas turbines, while permitting optimum selection of material for the various parts. Oxide-dispersion-hardened alloys should preferably also be given consideration for the airfoil.

In particular, it concerns a method for manufacturing rotating thermal machine blading consisting of an airfoil, a root and a shroud plate or shroud by fastening a shroud plate or a shroud to the tip of the airfoil.

It also concerns rotating thermal machine blading consisting of an airfoil, a root and a shroud plate or shroud, either of the latter two being fastened to the tip of the airfoil.

2. Discussion of Background

Shroud plates and shrouds on nozzle guide vane and rotor blade rows of rotating thermal machines (steam and gas turbines) are used to improve the flow conditions (aerodynamics) and the thermal efficiency (thermodynamics) of the machine. In addition, they are intended to improve the vibration behavior, in particular of rotors, by modifying the natural frequencies and increasing the damping. In mechanical engineering practice, numerous ways of fastening shroud plates and shrouds to the tip of the blading are known. In steam turbines, riveted shrouds are often found on the end surface of the tip of the blades. Shroud plates can also be manufactured from the solid by machining or by casting. On this subject, the following literature can, inter alia, be cited:

Walter Traupel, Thermische Turbomaschinen, Vol. 2 Regelverhalten, Festigkeit und dynamische Probleme, Springer Verlag 1960

H. Petermann, Konstruktion und Bauelemente von Strömungsmaschinen, Springer Verlag 1960

Fritz Dietzel, Dampfturbinen, Georg Lieberman Verlag 1950

Fritz Dietzel, Dampfturbinen, Berechnung, Konstruktion, Carl Hauser Verlag 1980

C. Zitemann, Die Dampfturbinen, Springer Verlag 1955.

In recent times, oxide-dispersion-hardened nickel-based superalloys have been proposed as blading materials for highly loaded gas turbines because they permit operating temperatures which are higher than those of conventional cast and forged superalloys. In order to achieve the best strength values (high creep strength) at high temperatures, components made from these alloys are employed with coarse longitudinally extended crystalites directed along the blade axis. During the manufacturing process, the workpiece (semi-finished product or finished part) must generally be subjected to a zone heat treatment process. For various reasons (thermodynamics, crystallisation laws), there are limits to the cross-sectional dimensions of such blade materials in the coarse-grained condition. This also imposes limits on the blade dimensions. Because the area of a shroud plate is generally a multiple of the cross-sectional area of the corresponding airfoil, there are dimensions beyond which it becomes impossible to manufacture the blading and the shroud plate monolithically from one piece. If oxide-dispersion-hardened superalloys are to be successfully and generally employed, there is therefore a requirement for the component to be divided into the blade airfoil, on the one hand, and the shroud plate, on the other.

Numerous frictional connections between structural elements using wedges, pins, wires, etc. are known in general mechanical engineering. Such elements are often used for locking purposes only. There is an increasing tendency to use oxide-dispersion-hardened superalloys as blading materials in the gas turbine industry. There is therefore a need for further development of operationally satisfactory constructions in this field.

SUMMARY OF THE INVENTION

The object of the invention is to provide rotating thermal machine blading consisting of an airfoil, a root and a shroud plate or shroud and to provide a method for its manufacture in such a way that the shroud plate or shroud is to be fastened to the tip of the airfoil and the mechanical engineer is provided with the highest possible degree of freedom in design and in the choice of materials optimally matched to one another. This applies particularly to the case where oxide-dispersion-hardened superalloys in the condition of longitudinally directed coarse columnar crystals are used for the airfoil because these materials are only commercially available within limited cross-sectional dimensions. In some cases, the shroud plate should be fastened so that it can be replaced (dismantled). The method should, as far as possible, be applicable whatever the material and under all the conditions appearing in practice in the construction of thermal machines.

This object is achieved, in the method mentioned at the beginning, in that the tip of the airfoil is provided with a spigot-type step similar to its profile, which step is provided with a groove of semi-circular cross-section on its generated surface in a plane at right angles to the radial longitudinal axis of the blading, and in that the shroud plate is provided with a recess corresponding to the profile of the step, in the internal generated surface of which recess is machined a groove of semi-circular cross-section with the same diameter as that of the groove in the step, in that, furthermore, these components prepared in this way are assembled in the direction of the longitudinal axis of the blading in such a manner that the grooves form a duct with complete circular cross-section, and in that at least one bright wire, pointed at its front end, is pushed and/or pulled into this duct and the wire ends protruding at the narrow side of the shroud plate are cut off.

The object is also achieved, in the blading mentioned at the beginning, in that the tip of the airfoil has a spigot-type step with an external semi-circular groove extending around the whole periphery of the generated surface, in that the shroud plate or the shroud has a recess, corresponding to the step of the airfoil, with an internal semi-circular groove extending around the whole of the periphery, and in that the circular cross-section duct thus formed by the grooves mentioned is filled in such a way by one or more bent, firmly seating pieces of a heat-resisting wire that a purely mechanical, firm connection exists between the tip of the airfoil and the shroud plate or the shroud.

DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
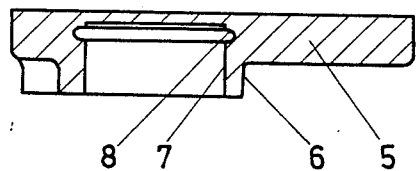
FIG. 1 shows the elevation (axial section) of a shroud plate.

Referring now to the drawings, wherein like reference numerals designate identical or corresponding parts throughout the several views, FIG. 1 shows the elevation of or axial section (with reference to the longitudinal axis of the turbine and the longitudinal axis of the turbine blade) through a shroud plate for the guide vane of a gas turbine. The shroud plate, which is made from a nickel-based superalloy (it being fundamentally possible to use a forged or cast non-dispersion-hardened alloy), is indicated by 5. The shroud plate 5 has a radiused step 6 provided with a rounding-off on its inner end surface. The inner end surface also has a recess 7 in the form of a blind hole extending at right angles to the main plane of the shroud plate 5. In plan view, this recess 7 has the shape of a wing section, similar to but smaller than that of the blade airfoil at the tip. On its generated surface, it also has a semi-circular groove 8, usually extending around the complete periphery, for accepting the wire 10.

Figure 2:
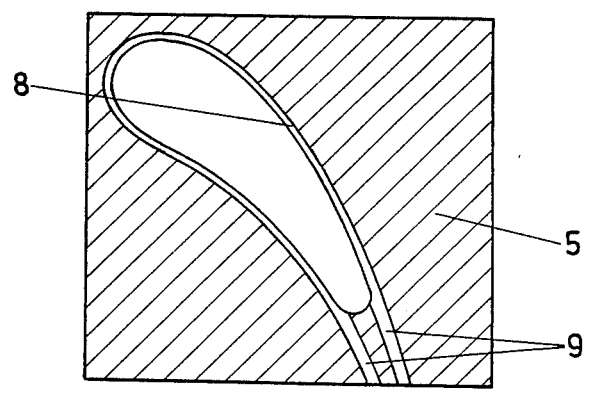
FIG. 2 shows the plan view (peripheral section) of a shroud plate.
Figure 2:
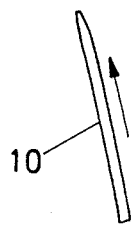

FIG. 2 shows the plan view (peripheral section) of the shroud plate 5 shown in FIG. 1. The groove 8 ends at the narrow end of the wing section and then merges "tangentially", while approximately retaining the particular curvature, into the two holes 9 used for introducing the wire 10. The latter consists of a heat-resisting alloy which can either be ductile and hardenable or else naturally hard or hardened. The beginning of the wire 10 is conically pointed and rounded. The arrow indicates the direction for introducing the wire 10 into one of the holes 9 of the shroud plate 5.

Figure 3:
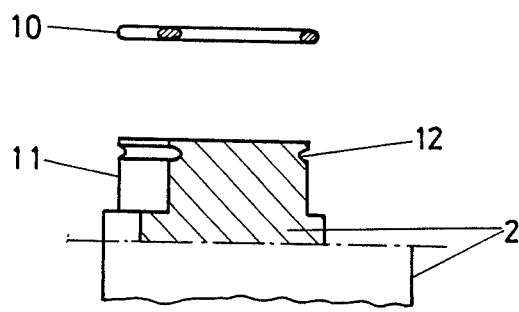
FIG. 3 shows the elevation (axial section) of the tip of the airfoil of gas turbine blading and the section through a wire loop.

FIG. 3 shows the elevation (axial section with reference to the longitudinal axis of the turbine and the longitudinal axis of the turbine blade) of the tip of the airfoil. A corresponding section through a wire loop is shown above it. The tip of the airfoil, shown partially in elevation and partially in section, is indicated by 2. A step, in the form of a spigot, at the tip 2 of the air-foil is indicated by 11. With the possible exception of a small tolerance for fitting, this step 11 has exactly the shape and the dimensions of the wing section of the recess 7 of the shroud plate 5 (positive corresponding to the negative shape of 7). The generated surface of the step 11 has a semi-circular groove 12 all round it for accepting the wire 10. The latter is shown above it in the form of a wire loop.

Figure 4:
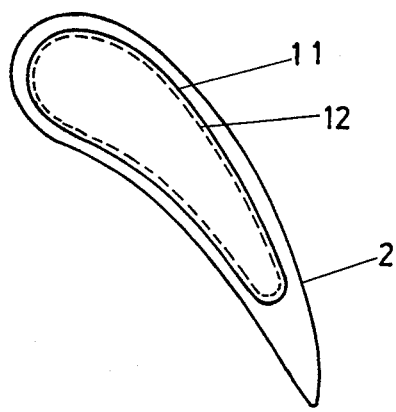
FIG. 4 shows the plan view (view in the radial direction) of the tip of the airfoil.

FIG. 4 shows the plan view (view in the radial direction of the turbine rotor) of the tip of the airfoil shown in FIG. 3. The reference signs correspond precisely to those of FIG. 3.

Figure 5:
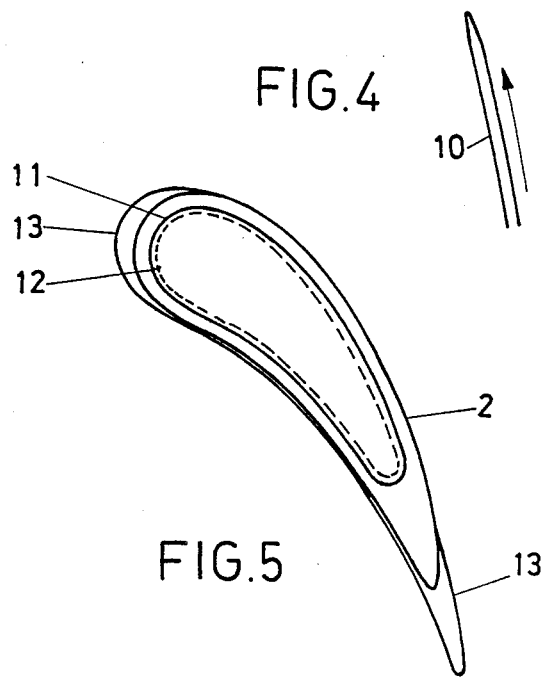
FIG. 5 shows the plan view (view in the radial direction) of the whole of the gas turbine blading airfoil.

FIG. 5 shows the plan view (view in the radial direction) of the whole gas turbine blading airfoil. The step (spigot) at the tip 2, shown in profile, is indicated by 11, the peripheral groove by 12, the profile of the air-foil at the tip by 2 and its profile at the root end by 13.

Figure 6:
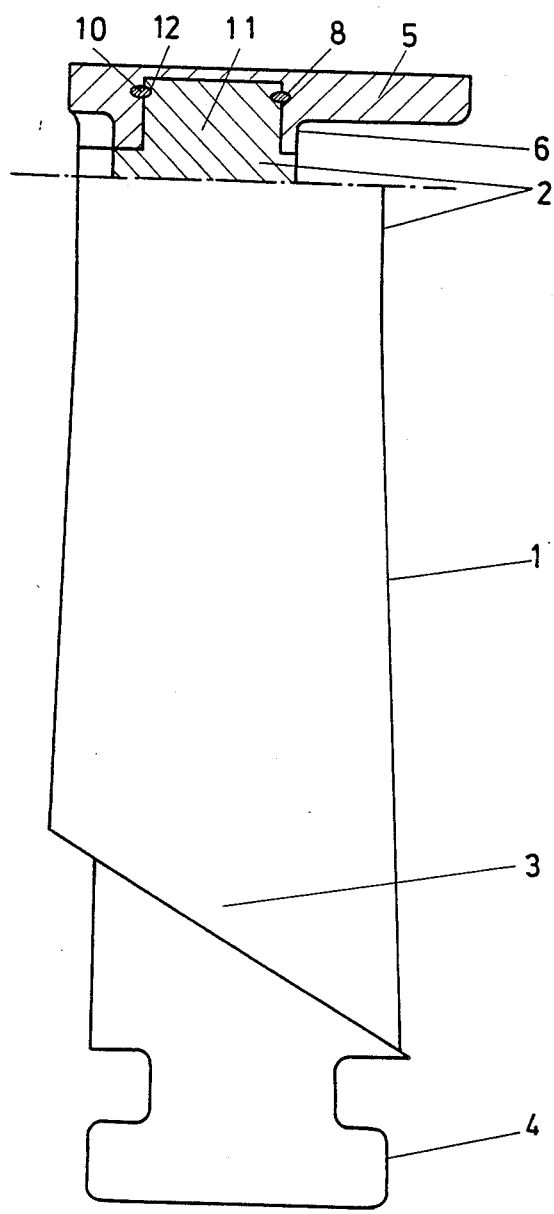
FIG. 6 shows the elevation/partial axial section of the shroud plate and of the gas turbine blading airfoil with wire fastening.

FIG. 6 shows the elevation/partial axial section of the whole of a turbine blading unit (shroud plate and airfoil). The airfoil has a tip 2, a root end 3 and a root 4 with fastening grooves and consists of an oxide-dispersion-hardened nickel-based superalloy with longitudinally directed coarse columnar crystals. The shroud plate, which has a rounded step 6, is indicated by 5, which shroud plate is fastened by means of the grooves 8 and 12 and the wire 10 to the step 11 of the airfoil, the step 6 fitting geometrically accurately on the tip 2.

Figure 7:
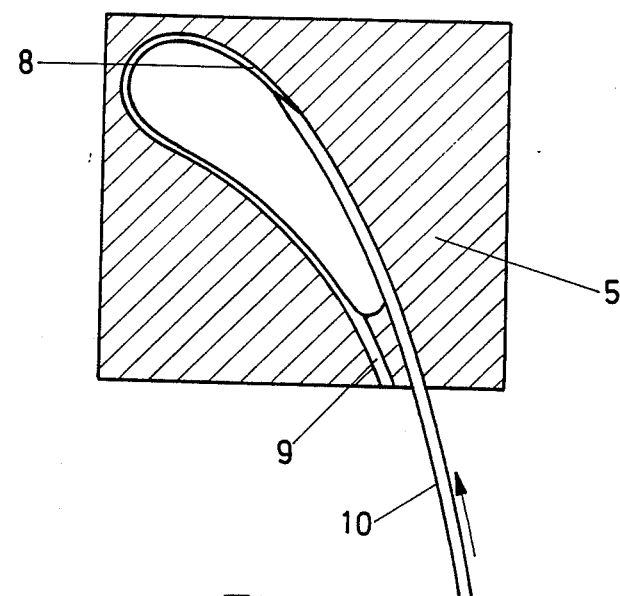
FIG. 7 shows the peripheral section of a shroud plate with wire inserted.

FIG. 7 shows the peripheral section of a shroud plate with the beginning of the wire pushed in. The figure represents the beginning of the insertion of the wire 10 through one hole 9 into the groove 8 in the shroud plate 5. The mating piece (the spigot 11 of the airfoil 1) has been omitted in this figure to make it more easily understood.

Figure 8:
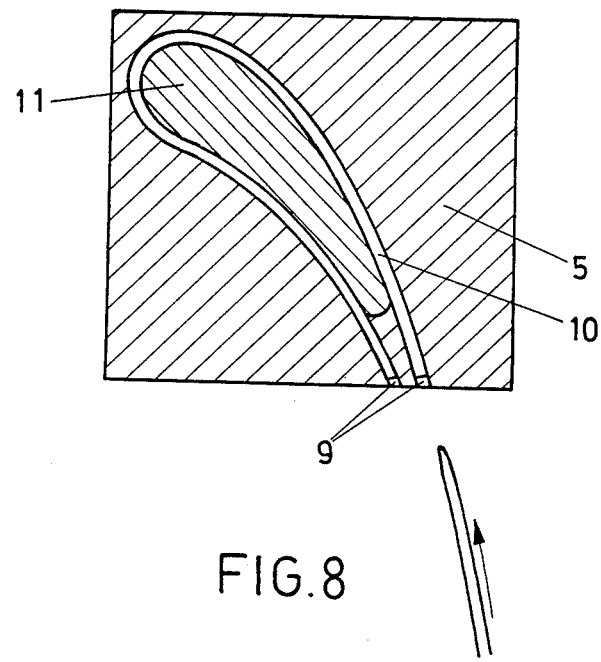
FIG. 8 shows the peripheral section of a shroud plate and the tip of the airfoil with fastening by a wire.

FIG. 8 shows the peripheral section of a shroud plate and the tip of the airfoil with fastening by a single wire. The wire 10 was inserted through one of the holes 9 into the hollow space of circular cross-section formed by the grooves in the step 11, at the tip of the airfoil, and the shroud plate 5, and has been jammed in position.

Figure 9:
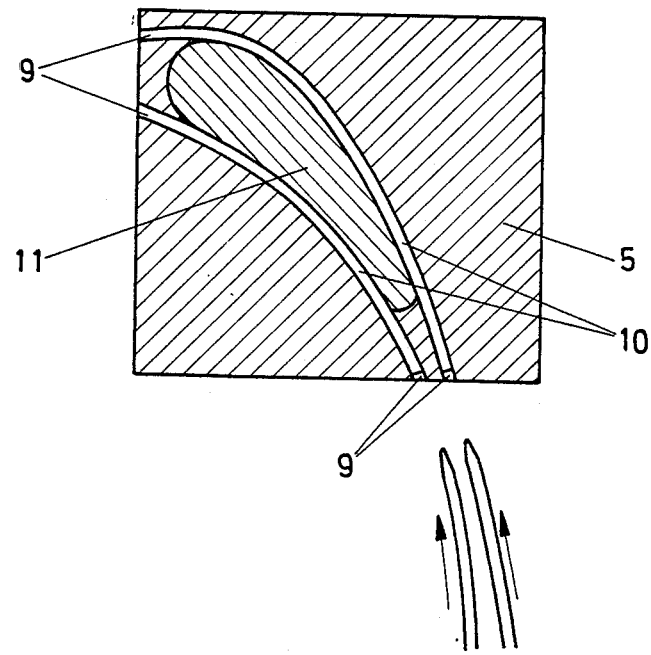
FIG. 9 shows the peripheral section of a shroud plate and the tip of the airfoil with fastening by two wires.

FIG. 9 shows the peripheral section of a shroud plate and of the tip of the airfoil with a fastening arrangement by means of two wires. The shroud plate 5 has a total of four holes 9, each of which meets the wing section at the step 11. The wires 10 can, in this case, consist of a naturally hard or already hardened heat-resisting alloy because the radii of curvature which have to be traversed are comparatively large - measured relative to the wire diameter. The arrows indicate the insertion directions of the points of the wire.

Figure 10:
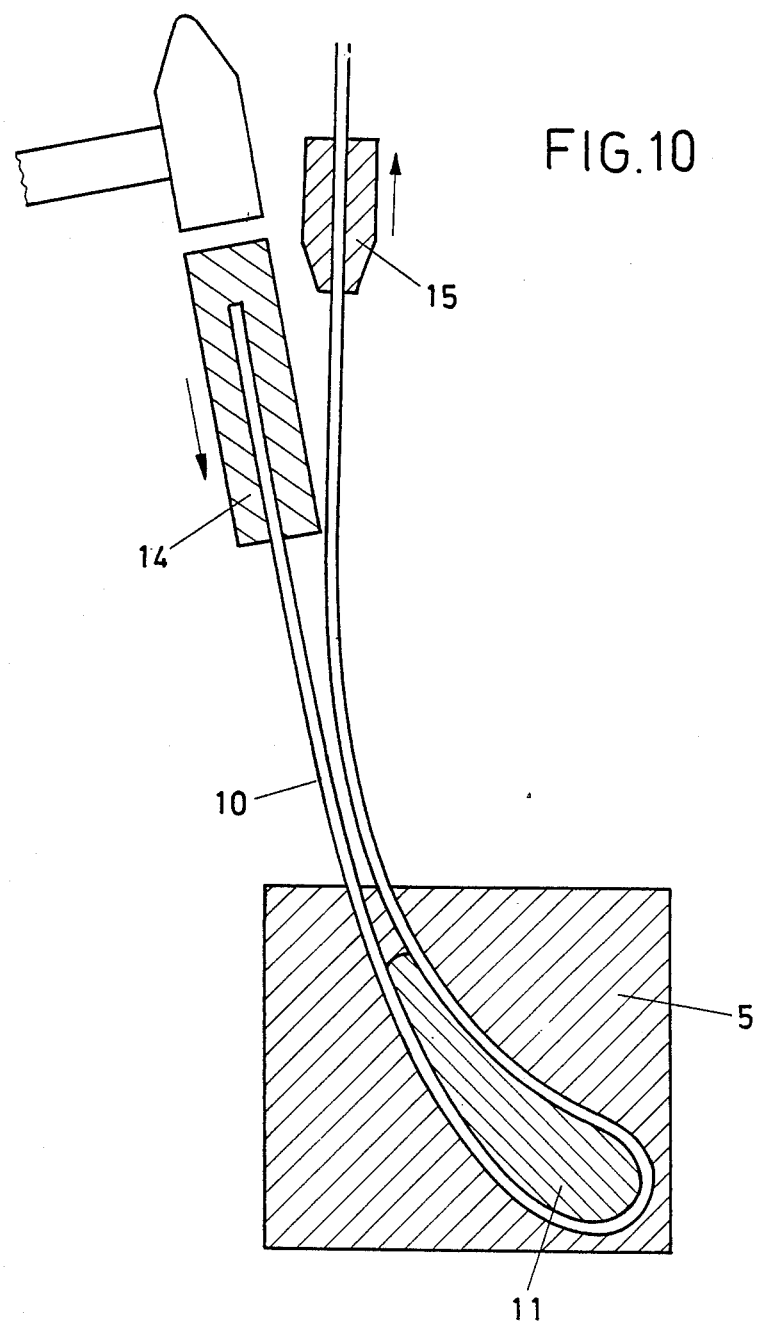
FIG. 10 shows, in peripheral section, a wire of full diameter being pushed/pulled through, FIG. 11 shows, in peripheral section, the insertion and subsequent pulling through of a wire of variable diameter.

FIG. 10 shows, in peripheral section, a wire of full diameter being pushed or pulled through the workpiece parts (airfoil and shroud plate) which have been assembled in the axial direction. The shroud plate 5 and the step 11 at the tip of the airfoil are shown in section. The wire 10 is pushed into the groove present between 5 and 11 and is transported further by means of a pushing device (sleeve) 14—indicated by hammer blows—and a pulling device (clamping jaws) 15. The diameter of the wire 10 is approximately equal to that of the groove. The direction of transport is indicated by arrows.

Figure 11:
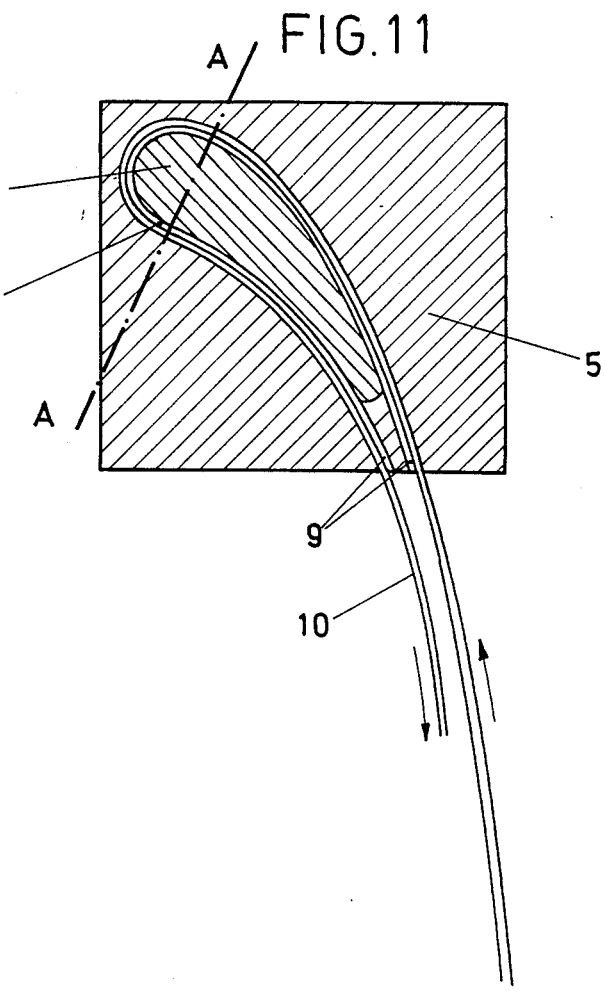

FIG. 11 shows, in peripheral section, a wire of variable diameter being inserted and subsequently pulled through. The first part of the wire 10 has a diameter which correspond to half the diameter of the groove 8 in the shroud plate 5 or of the groove 12 in the step 11. It is laid through the holes 9 in 5 before 5 and 11 are pushed together. After 5 and 11 have been pushed together axially, the wire 10, whose second part exhibits a gentle cone which extends until the full diameter of the groove 8 or 12 is reached, is pulled through in the direction of the arrow until the last part of the full diameter comes into contact with the full length of the duct formed by the grooves 8 and 12.

Figure 12:
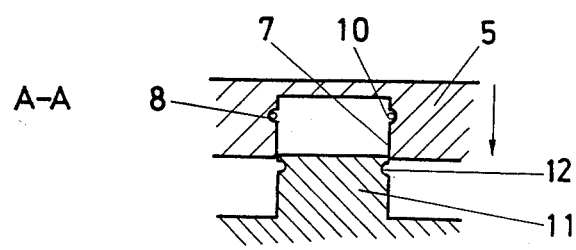
FIG. 12 shows, in a longitudinal section through the blade, the shroud plate being placed onto the tip of the blade airfoil after the insertion of the beginning of the wire of half diameter.

FIG. 12 diagrammatically illustrates, in a longitudinal section A—A through the blade (see FIG. 11), the placing of the shroud plate 5 on the step 11 (spigot) at the tip of the airfoil 1 after the start of the wire of half the groove diameter has been laid in position. The wire 10 of half the diameter of the grooves is laid in the groove 8 of the shroud plate 5. The figure shows the moment when the shroud plate 5 is placed by means of its recess 7 (blind hole) over the step 11 until its groove 8 is brought into a position coincident with the groove 12.

Figure 13:
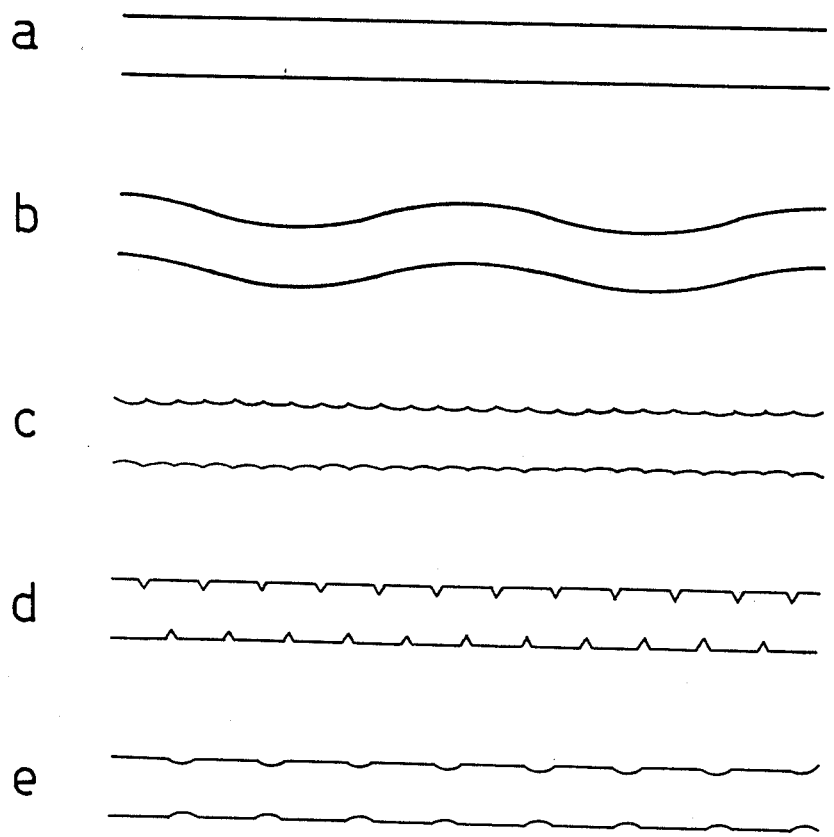
FIG. 13 shows various wire shapes in longitudinal representation.

FIG. 13 shows the various wire shapes in longitudinal direction. The figure is self-explanatory. The small letters indicate:

|    |                  |
|----|------------------|
| a: | smooth, straight |
| b: | wavy             |
| c: | knurled          |
| d: | notched          |
| e: | necked-in        |

ILLUSTRATIVE EXAMPLE 1

See FIGS. 1, 2, 3, 5, 6, 7, 8 and 10.

An airfoil 1 for a gas turbine nozzle guide vane is manufactured by machining from an oxide-dispersion-hardened nickel-based superalloy. The material was available in the form of a prismatic semi-finished product with a rectangular cross-section, 100 mm wide by 30 mm thick, in the zone heat-treated recrystallised coarse-grain condition. The longitudinally directed columnar crystals had, on average, a length of 15 mm, a width of 5 mm and a thickness of 2.5 mm. The INCO material, designated by the commercial name MA 6000, had the following composition:

| Cr       | = | 15.0 % by weight |
| Al       | = | 4.5 % by weight  |
| Ti       | = | 2.5 % by weight  |
| Mo       | = | 4.0 % by weight  |
| Ta       | = | 2.0 % by weight  |
| Zr       | = | 0.25 % by weight |
| B        | = | 0.01 % by weight |
| C        | = | 0.05 % by weight |
| $Y_2O_3$ | = | Rest % by weight |

The airfoil 1 of wing section had the following dimensions:

| Total length (incl. root) | = | 185 mm |
| Maximum width             | = | 95 mm  |
| Maximum thickness         | = | 22 mm  |
| Profile height            | = | 27 mm  |

The tip 2 of the airfoil 1 had a step machined on its generated surface. The step 11 was 12 mm high in the axial direction of the vane, was of wing section and had, at its upper end, a peripheral semi-circular groove 12 of 2.5 mm diameter.

The wing section of the step 11 (spigot) had the following dimensions:

| Width             | = | 58 mm |
| Maximum thickness | = | 17 mm |
| Profile height    | = | 20 mm |

A shroud plate 5 was cast from a non-dispersion-hardened nickel-based cast superalloy. The INCO alloy, with the commercial name of IN 738, had the following composition:

| Cr | = | 16.0 % by weight |
| Co | = | 8.5 % by weight  |
| Mo | = | 1.75 % by weight |
| W  | = | 2.6 % by weight  |
| Ta | = | 1.75 % by weight |
| Nb | = | 0.9 % by weight  |
| Al | = | 3.4 % by weight  |
| Ti | = | 3.4 % by weight  |
| Zr | = | 0.1 % by weight  |
| B  | = | 0.01 % by weight |
| C  | = | 0.11 % by weight |
| Ni | = | Rest             |

The dimensions of the shroud plate 5, after machining, were:

| Length (axial)       | = | 70 mm |
| Width (tangential)   | = | 60 mm |
| Total height (radial)| = | 14 mm |

A recess 7 in the form of a 12 mm deep blind hole of wing section was produced by machining in the shroud plate 5. A groove 8 of semi-circular cross-section and 2.5 mm diameter was cut out around the recess 7 on the whole of its generated surface at an average distance of 3 mm from the bottom of the recess. Two holes 9 of 2.5 mm diameter were also produced at the same height.

A smooth, straight wire 10 of 2.5 mm diameter made from a heat-resisting forged alloy was now conically pointed at one end and the point was rounded. The heat-resisting non-hardening nickel-based superalloy was employed in the ductile condition; it had the INCO commercial name of IN 625 and the following composition:

| Cr | = | 21.5 % by weight |
| Mo | = | 9.0 % by weight  |
| Nb | = | 3.6 % by weight  |
| Al | = | 0.2 % by weight  |
| Ti | = | 0.2 % by weight  |
| Fe | = | 2.5 % by weight  |
| Mn | = | 0.2 % by weight  |
| Si | = | 0.2 % by weight  |
| C  | = | 0.05 % by weight |

-continued

| | | |
|---|---|---|
| Ni | = | Rest. |

The tip 2 of the airfoil 1 and the shroud plate 5 were pushed together axially. The wire 10 was now introduced via a hole 9 into the duct formed by the grooves 8 and 12 by means of the pushing device 14, which consisted of a steel sleeve which received hammer blows in the axial direction on its end surface, and the wire was then cut off approximately at the height of the corresponding narrow end of the shroud plate 5.

A pull-off test in the axial direction of the airfoil 1 at room temperature gave a pull-off force at fracture of about 30,000N. The shroud plate was not torn out of the anchoring arrangement; the fracture occurred, in fact, in the step 1 (spigot) of the airfoil 1; at its front end, the shear stresses exceeded the relevant permissible limiting value for oxide-dispersion-hardened nickel-based superalloys with columnar crystals.

ILLUSTRATIVE EXAMPLE 2

See FIGS. 1, 3, 5, 6, 9 and 10.

An airfoil of the same dimensions and the same composition (MA 6000) as that given in Example 1 was manufactured from an oxide-dispersion-hardened nickel-based superalloy as described in Example 1. The same applies to the dimensions of the step 11 (spigot).

A shroud plate 5 with the same dimensions as those in Example 1 was manufactured from bar stock of a non-dispersion-hardened nickel-based forged superalloy (semifinished product) by cutting off a disk and machining it. The alloy, with the commercial name of Nimonic 80A, had the following composition:

| | | |
|---|---|---|
| Cr | = | 19.5 % by weight |
| Al | = | 1.4 % by weight |
| Ti | = | 2.4 % by weight |
| Zr | = | 0.06 % by weight |
| Mn | = | 0.30 % by weight |
| Si | = | 0.30 % by weight |
| B | = | 0.003 % by weight |
| C | = | 0.06 % by weight |
| Ni | = | Rest. |

A recess 7 with a groove 8 was machined in the shroud plate 5 in a manner analogous to Example 1 (shape: wing section). Two holes 9 were produced on each of the two narrow sides of the shroud plate 5 as connections to the groove 8. Wires 10 of a slightly wavy shape ("b" in FIG. 13) and a diameter of 2.5 mm in a heat-resisting forged alloy were now pointed at one end and the points rounded. The nickel-based superalloy used was employed in the naturally hard condition. It had the commercial name of Nimonic 90 and had the following composition:

| | | |
|---|---|---|
| Cr | = | 19.5 % by weight |
| Co | = | 16.5 % by weight |
| Al | = | 1.45 % by weight |
| Ti | = | 2.45 % by weight |
| Zr | = | 0.06 % by weight |
| Mn | = | 0.30 % by weight |
| Si | = | 0.30 % by weight |
| B | = | 0.003 % by weight |
| C | = | 0.07 % by weight |
| Ni | = | Rest. |

The shroud plate 5 and the airfoil tip 2 were pushed together axially. The wires 10 were now pushed into the ducts formed by the grooves 8 and 12 and cut off.

Tear-off tests were carried out at room temperature. The fracture load was just 30,000N. The fracture, which was initiated because the shear strength of the airfoil material was exceeded, occurred within the step 11 of the airfoil 1.

ILLUSTRATIVE EXAMPLE 3

See FIGS. 1, 3, 5, 6, 11 and 12.

An airfoil 1 for a gas turbine nozzle guide vane was produced by machining from an oxide-dispersion-hardened nickel-based superalloy. The material was available in the form of a prismatic semi-finished product with a rectangular cross-section, 120 mm wide and 32 mm thick, in the zone heat-treated recrystallized coarse-grain condition. The longitudinally directed columnar crystals had, on average, a length of 18 mm, a width of 6 mm and a thickness of 3 mm. The material had the following composition:

| | | |
|---|---|---|
| Cr | = | 20.0 % by weight |
| Al | = | 6.0 % by weight |
| Mo | = | 2.0 % by weight |
| W | = | 3.5 % by weight |
| Zr | = | 0.19 % by weight |
| B | = | 0.01 % by weight |
| C | = | 0.01 % by weight |
| $Y_2O_3$ | = | 1.1 % by weight |
| Ni | = | Rest. |

The airfoil 1 of wing section had the following dimensions:

| | | |
|---|---|---|
| Total length (incl. root) | = | 200 mm |
| Maximum width | = | 100 mm |
| Maximum thickness | = | 24 mm |
| Profile height | = | 30 mm. |

A step was machined on the generated surface of the tip 2 of the airfoil 1. The step 11 was 13 mm high in the axial direction of the vane, was of wing section and had a peripheral semi-circular groove 12 of 2 mm diameter at its upper end. The wing section of the step 11 (spigot) had the following dimensions:

| | | |
|---|---|---|
| Width | = | 65 mm |
| Maximum thickness | = | 19 mm |
| Profile height | | 23 mm |

A shroud plate 5 was cut out of a sheet of nickel-based forged superalloy. The alloy, with the commercial name of Hastelloy X, had the following composition:

| | | |
|---|---|---|
| Cr | = | 22.0 % by weight |
| Co | = | 1.5 % by weight |
| Mo | = | 9.0 % by weight |
| W | = | 0.6 % by weight |
| Fe | = | 18.5 % by weight |
| Mn | = | 0.50 % by weight |
| Si | = | 0.50 % by weight |
| C | = | 0.10 % by weight |
| Ni | = | Rest. |

After machining, the dimensions of the shroud plate 5 were:

| Length (axial) | = | 72 mm |
|---|---|---|
| Width (tangential) | = | 65 mm |
| Total height (radial) | = | 16 mm |

A recess 7 in the form of a 13 mm deep blind hole of wing section was machined in the shroud plate 5. A peripheral groove 8 of 2 mm diameter semi-circular cross-section was cut out on its generated surface and, in addition, two holes 9 of the same diameter were produced.

A smooth, straight wire 10 of variable diameter was now prepared in such a way that its first part had a diameter of 1 mm (=half the diameter of the groove 8) over a length which corresponded to the periphery of the tip 2 of the airfoil 1. This was followed by a gentle conical piece and the rest had the full diameter of 2 mm. The wire 10 consisted of a hardenable nickel-based forged superalloy with the commercial name of Nimonic 80A, whose composition is given in Example 2. It was employed in the ductile condition, first solution heat-treated and then quenched. The 1 mm diameter part of this variable diameter wire 10 was now inserted via the holes 9 into the groove 8 of the recess 7 in the shroud plate 5 and the latter placed axially over the step 11 (spigot) of the tip 2 of the airfoil 1. The wire 10 was then pulled along in the direction of the arrow (FIG. 11) until its full diameter part came into contact with the duct formed by the grooves 8 and 12. The protruding ends of the wire 10 were then cut off. The wire 10 was finally hardened by annealing (ageing) for a period of 8 hours at 1020° C. and for 16 hours at 700° C.

A special ageing process can also be omitted in appropriate cases. Such a process then takes place automatically during the course of the initial operating period by reacting the maximum permissible operating temperature of the vane.

ILLUSTRATIVE EXAMPLE 4

See FIGS. 1, 3, 5, 6, 11 and 12.

An airfoil 1 for a gas turbine guide vane was produced by machining from an oxide-dispersion-hardened nickel-based superalloy. The material was available in the form of a prismatic semi-finished product with a rectangular cross-section, 100 mm wide and 30 mm thick, in the zone heat-treated recrystallized coarse-grain condition. The longitudinally directed columnar crystals had, on average, a length of 22 mm, a width of 7 mm and a thickness of 3 mm. The material had the following composition:

| Cr | = | 17.0 % by weight |
|---|---|---|
| Al | = | 6.0 % by weight |
| Mo | = | 2.0 % by weight |
| W | = | 3.5 % by weight |
| Ta | = | 2.0 % by weight |
| Zr | = | 0.15 % by weight |
| B | = | 0.01 % by weight |
| C | = | 0.05 % by weight |
| $Y_2O_3$ | = | 1.1 % by weight |
| Ni | = | Rest. |

The airfoil 1 of wing section had the following dimensions:

| Total length (incl. root) | = | 190 mm |
|---|---|---|
| Maximum width | = | 90 mm |
| Maximum thickness | = | 26 mm |
| Profile height | = | 30 mm. |

A step was machined on the generated surface of the tip 2 of the airfoil 1. The step 11 was 14 mm high in the axial direction of the vane, was of wing section and had a peripheral semi-circular groove 12 of 3 mm diameter at its upper end. The wing section of the step 11 (spigot) had the following dimensions:

| Width | = | 55 mm |
|---|---|---|
| Maximum thickness | = | 20 mm |
| Profile height | = | 24 mm |

A shroud plate 5 was cast from a non-dispersion-hardened nickel-based cast superalloy. The alloy, with the INCO commercial name of IN 939, had the following composition:

| Cr | = | 22.4 % by weight |
|---|---|---|
| Co | = | 19.0 % by weight |
| Ta | = | 1.4 % by weight |
| Nb | = | 1.0 % by weight |
| Al | = | 1.9 % by weight |
| Ti | = | 3.7 % by weight |
| Zr | = | 0.1 % by weight |
| C | = | 0.15 % by weight |
| Ni | = | Rest. |

The dimensions of the shroud plate 5 after machining were:

| Length (axial) | = | 68 mm |
|---|---|---|
| Width (tangential) | = | 58 mm |
| Total height (radial) | = | 18 mm. |

A recess 7 in the form of a 14 mm deep blind hole of wing section was machined in the shroud plate 5. A peripheral groove 8 of 3 mm diameter semi-circular cross-section was cut out on its generated surface and, in addition, two holes 9 of the same diameter were produced.

A wire 10 of variable diameter, similar to that indicated in Example 3, was now prepared. The last piece of the wire 10 available with the full diameter of 3 mm was then periodically necked-in as shown in FIG. 13e over a length which corresponded to the periphery of the tip 2 of the airfoil 1. The wire 10 consisted of the hardenable nickel-based forged alloy with the commercial name of Nimonic 90, whose composition is given in Example 2. It was employed in the ductile condition, first solution heat-treated and then quenched. The wire 10 was heat treated for 2 hours at a temperature of 1050° C. and then quenched in water. The rest of the procedure was exactly as given in Example 3. The wire was finally subjected to hardening by heat treatment, which consisted of annealing for 8 hours at 1080° C., followed by air cooling, and for 16 hours at 700° C., again followed by air cooling.

The tear-off test gave a force in the axial direction of the blade of about 30,000N at fracture. The airfoil 1 was not torn out of the anchoring, but was sheared off axially along the grain boundaries of the columnar crystals.

Obviously, numerous modifications and variations of the present invention are possible in the light of the above teachings. It is therefore to be understood that within the scope of the appended claims, the invention may be practiced otherwise than as specifically described herein. The method is fundamentally suitable for manufacturing blading from any given material combinations and for any given types of thermal machines such as steam and gas turbines, turbo-compressors, etc. The main field of application is provided, however, by the oxide-dispersion-hardened nickel-based superalloys and corresponding ferritic iron-based alloys as materials for the airfoil 1 for highly loaded gas turbines. The materials which can be considered for the wire 10, consisting of one or more pieces, are heat-resisting naturally hard materials in the form of nickel alloys, hardenable or already hardened nickel-based superalloys (forged alloys) and heat-treatable iron alloys (for example martensitic steels). The hardenable wire 10 is introduced, in this case, in the solution heat-treated and quenched ductile structure condition into the duct, formed by the grooves 8 and 12, of the components 1 and 5 to be connected. The wire 10 can be held by friction forces or can be additionally fastened to the airfoil 1 or to the shroud plate 5 or can be secured by welding, brazing, upsetting, caulking or bending. Non-oxide-dispersion-hardened nickel cast or forged alloys or corrosion-resistant ferritic steels can be used advantageously as the materials for the shroud plate or the shroud. Instead of a single duct formed by the grooves 8 and 12, several such ducts can also be provided, whereby the transmission forces are distributed in the axial direction of the blading. The cross-section of the wire 10 can also deviate from the circular shape and can be made square, rectangular or oval. If, for design and-/or materials technology reasons, the root 4 should not or cannot be designed as a monolithic unit with the airfoil 1, a separate root piece between the airfoil 1 and the casing or rotor body is then usually necessary. This root piece can, advantageously, consist of a material which is different from that of the airfoil 1. See above, the case of the oxide-dispersion-hardened nickel-based superalloys for the airfoil 1. The root piece mentioned can then be fastened to the airfoil 1 by means of wire 10 in precisely the same manner as the shroud plate 5.

What is claimed as new and desired to be secured by Letters Patent of the United States is:

1. A method manufacturing rotating thermal machine blading, consisting of an airfoil (1), a root (4) and a shroud plate (5) or a shroud, by fastening a shroud plate (5) or a shroud to the tip (2) of the airfoil (1), wherein the tip (2) is provided with a spigot-type step (11) similar to its profile, which step is provided with a groove (12) of semi-circular cross-section on its generated surface in a plane at right angles to the radial longitudinal axis of the blading, and wherein the shroud plate (2) is provided with a recess (7) corresponding to the profile of the step (11), in the internal generated surface of which recess is machined a groove (8) of semicircular cross-section with the same diameter as that of the groove (12) in the step (11), wherein, furthermore, these components (1; 5) prepared in this way are assembled in the direction of the longitudinal axis of the blading in such a manner that the grooves (8; 12) form a duct with complete circular cross-section, and wherein at least one bright wire (10), pointed at its front end, is pushed and/or pulled into this duct and the wire ends protruding at the narrow side of the shroud plate (5) are cut off.

2. A method as claimed in claim 1, wherein a wire (10) made from a heat-resisting naturally hard material is pushed into the duct, formed by the grooves (8, 12), between the airfoil (1) and the shroud plate (5).

3. A method as claimed in claim 1, wherein a wire (10) made from a hardenable solution-treated and quenched ductile material is pushed into the duct, formed by the grooves (8, 12), between the airfoil (1) and the shroud plate (5) and is subsequently precipitation-hardened by heat treatment.

4. A method as claimed in claim 1, wherein the wire (10) has a smooth straight surface.

5. A method as claimed in claim 1, wherein the wire (10) has a wavy, knurled, notched or necked-in surface.

6. A method as claimed in claim 1, wherein the wire (10) is additionally fastened or secured by welding, brazing, upsetting, bending or caulking to the airfoil (1) and/or to the shroud plate (5).

7. A method as claimed in claim 1, wherein an oxide-dispersion-hardened nickel-based superalloy is used for the airfoil (1), a nickel-based cast or forged superalloy is used for the shroud plate (5) and a nickel-based forged superalloy is used for the wire (10).

8. A method as claimed in claim 1, wherein an oxide-dispersion-hardened ferritic iron-based alloy is used for the airfoil (1), a corrosion-resistant ferritic steel is used for the shroud plate (5) and a heat-treatable martensitic steel is used for the wire (10).

9. Blading for a rotating thermal machine, consisting of an airfoil (1), a root (4) and a shroud plate (5) or a shroud, either of the last two being fastened to the tip (2) of the airfoil (1), wherein the tip (2) of the airfoil (1) has a spigot-type step (11) with an external semicircular groove (12) extending around the whole periphery of the generated surface, wherein the shroud plate (5) or the shroud has a recess (7), corresponding to the step (11) of the airfoil (1), with an internal semi-circular groove (8) extending around the whole of the periphery, and wherein the circular cross-section duct thus formed by the grooves (8, 12) mentioned is filled in such a way by one or more bent, firmly seating pieces of a heat-resisting wire (10) that a purely mechanical, firm connection exists between the tip (2) of the airfoil (1) and the shroud plate (5) or the shroud.

10. Blading as claimed in claim 9, wherein the wire (10) has a smooth surface.

11. Blading as claimed in claim 9, wherein the wire (10) has a wavy, knurled, notched or necked-in surface.

12. Blading as claimed in claim 9, wherein the wire (10) is held by frictional forces only on the tip (2) of the airfoil (1) or the shroud plate (5) or the shroud without additional fastening in such a manner that the shroud plate (5) or shroud can be removed from the airfoil (1).

13. Blading as claimed in claim 9, wherein the wire (10) is additionally held by a welded or brazed connection or by upsetting, clamping or bending on the tip (2) of the airfoil (1) or on the shroud plate (5) or the shroud.

14. Blading as claimed in claim 9, wherein the airfoil (1) consists of an oxide-dispersion-hardened nickel-based superalloy, the shroud plate (5) or the shroud consists of a nickel-based cast or forged superalloy, and the wire (10) consists of a nickel-based forged superalloy.

15. Blading as claimed in claim 9, wherein the airfoil (1) and the root (4) consist of an oxide-dispersion-hardened ferritic iron-based alloy, the shroud plate (5) or the shroud consists of a corrosion-resistant ferritic steel, and the wire (10) consists of a heat-treatable martensitic steel.

* * * * *